United States Patent [19]
Endter et al.

[11] Patent Number: 5,132,357
[45] Date of Patent: Jul. 21, 1992

[54] TREAD RUBBER EMPLOYING HIGH STRUCTURED CARBON BLACK AND TIRES USING SAME

[76] Inventors: Norman G. Endter, 3910 Silverwood Dr., Stow, Ohio 44224; Eric C. Mizner, 944 Wallwood Dr., Copley, Ohio 44321

[21] Appl. No.: 531,669

[22] Filed: Jun. 1, 1990

[51] Int. Cl.$^5$ .......................... C08K 3/04; C08L 7/00; C08L 9/00
[52] U.S. Cl. ............................... 524/496; 152/209 R; 524/495
[58] Field of Search ............................. 524/495, 496; 152/209 R

[56] References Cited

U.S. PATENT DOCUMENTS

| | | | |
|---|---|---|---|
| 4,154,277 | 5/1979 | Sato et al. | 152/209 R |
| 4,644,988 | 2/1987 | Ahmad et al. | 152/209 R |
| 4,703,079 | 10/1987 | Ahmad et al. | 524/496 |
| 4,732,927 | 3/1988 | Ida et al. | 524/495 |
| 4,871,794 | 10/1989 | Itoh et al. | 524/495 |
| 4,908,481 | 3/1990 | Ohara et al. | 524/495 |
| 4,914,147 | 4/1990 | Mouri et al. | 524/496 |

OTHER PUBLICATIONS

Abstract of JP 1103501 Apr. 20, 1989.
Rubber World, pp. 19-33 "Industrial Rubber Products: and Compound Performance" (May 1990).
R. T. Vanderbilt Rubber Handbook, Jan. 12, 1989, "Rubber Grade Carbon Blacks".
"The Nature of Carbon Blacks" Columbian Chemical Co.

Primary Examiner—Allan M. Lieberman

[57] ABSTRACT

A high structured carbon black having a relatively large particle size and a high surface activity is provided for use in the tread rubber of a pneumatic tire. Tires made using the black demonstrate improved irregular wear and roll resistance properties.

16 Claims, 2 Drawing Sheets

TREAD RUBBER EMPLOYING HIGH STRUCTURED CARBON BLACK AND TIRES USING SAME

BACKGROUND

The invention relates to tread rubber compounds made employing a high structure carbon black as a reinforcing material, and a pneumatic tire made using tread rubber which is reinforced using the carbon black.

Irregular treadwear on tires is a relatively recent problem which has been caused, in part, by the requirements imposed by recent changes in vehicle construction. Vehicles with broad specifications for both camber and toe-in, and front wheel drive vehicles, are particularly prone to causing irregular wear on tires. Front wheel drive vehicles, in comparison to the traditional rear wheel drive vehicles, tend to quickly wear out the drive tires and have a very slow treadwear rate on the free rolling tires. This slow wear rate on the free rolling tires, in combination with other factors, proves to quicken the onset, and magnify the relative amount of irregular treadwear.

Chassis designs with independent swing axle suspensions are also found to increase the possibility or severity of irregular wear.

Further complicating the problem is the fact that in the competitive tire industry, it is a goal to provide tires having treads that demonstrate good all weather traction and have distinctive designs. Because of design considerations, it is sometimes desirable to provide tread lugs of a length that traverses several zones of the footprint area of the tire. Because different stresses or forces are encountered by different zones of the footprint when a tire is in motion, depending on whether the zone is in the shoulder area, equatorial plane, near the leading edge of the footprint, the trailing edge of the footprint or the middle of the footprint, it has been discovered that some tire designs may be especially subject to irregular wear.

It has been theorized that in some tire designs irregular wear occurs when a leading edge of a relatively long tire lug is free of the footprint area of the tire while a second portion of the tread lug is still in the footprint area of the tire, and the different stresses encountered cause a distortion of the tread lug; and when the portion of the lug under compression starts to come out of the footprint area, the original shape of the lug is restored with a snap, and the motion or squirm associated with the snap wears the trailing portion of the lug against the road surface. It is also possible for wear to occur at the leading edge of the footprint because of the initial compression of the lug in the footprint.

In order to avoid this problem, it was theorized that a tread rubber compound that has a high stiffness (to minimize squirm of the lug in the footprint area) yet had good rolling resistance properties, while maintaining good traction could be developed by choosing the right combination of rubber and rubber fillers and reinforcers.

It is proposed, in accordance with the present invention, to optimize rubber reinforcement to address this problem.

It is well known that high surface area, small particle size carbon blacks provide greatest reinforcement in an elastomer, as evidenced by improved resistance to abrasion, tensile strength and tear properties: concomitantly, superfine blacks also provide higher hysteresis and poorer dynamic performance attributable to high heat build-up, both adverse properties. In addition, it is known that larger size blacks provide reduced rolling resistance and poorer traction, both wet and dry.

In the recent past, the emphasis has been on reduction of rolling loss for lower fuel consumption without sacrificing wear resistance. Ignoring changes in tire construction to aid in this respect, several approaches have been taken towards attaining this goal, as taught in U.S. Pat. Nos. 3,824,206; 4,224,197 and 4,281,703, inter alia: and United Kingdom patent applications Nos GB 2,082,486A and 2,057,455A.

U.S. Pat. No. 4,644,988 is concerned with deliberately increasing the rolling resistance and heat buildup in a tire.

The presence of a black in tread rubber also provides a hysteretic component essential to traction, as do other reinforcing ingredients such as silica. Although there are certain correlations between black properties and the properties of tread rubbers using the black that can be made, there is no certain way known to predict the ultimate effects of the use of a particular black in tread rubber, which effects must therefore be determined or confirmed by experiment. The choice of the type and amount of carbon black used in the tread compound influences many performance properties of a tire. N100 to N300 blacks are used in tires where excellent abrasion resistance and tear properties are important, as for example in truck and passenger tires for all types of vehicles.

The distinction between grades of carbon blacks are based on three main factors which are broadly classified as follows:

1. Particle size, particularly as it relates to surface area.
2. Structure, a general measure of particle-to-particle association, or, i.e. the strength of the aggregate.
3. Chemical composition of the surface, or surface activity.

Surface area (1), generally measured by iodine number ("$I_2No.$"), and structure (2), generally a measure of void volume, in turn measured by dibutyl phthalate absorption ("DBPA"), are key attributes which characterize a carbon black.

This invention relates to the use of particular tread carbon blacks, having very high structure, in tread rubber compounds.

A detailed discussion of some of the foregoing considerations is presented in an article titled "The Effects of Carbon Black and Other Compounding Variables on Tire Rolling Resistance and Traction" by W. M. Hess and W. K. Klamp, Rubber Chemistry and Technology, Vol. 56, No. 2 May-Jun. 1983. A predominately SBR tire tread with minor amounts of polybutadiene rubber (BR) essentially all of which is cis-, and/or natural rubber (NR), and an oil loading of typically about 70/40 black/oil ratio with a high structure N220 black, was used to study the effects of carbon black and other variables on tire tread wear, rolling resistance and traction, among other objectives. The blacks tested varied in nitrogen surface area ($N_2SA$), ASTM tint, and DBPA.

In the prior art, carbon black used in tread compounds has a DBPA in the range of 110–130 $cm^3/100$ g and an $I_2$ number in the range of 65–110 mg/gm. Tires with good rolling resistance properties, in general, use tread carbon black having properties in the low end range of the $I_2$ numbers (large size). Slight rolling resistance advantages are seen in tires made with carbon blacks having a DBPA of 130 cm$^3$/100 gm (higher structure) when compared with tires made with blacks having a DBPA of 110 cm$^3$/100 g.

It has also been recognized that the physico-chemical nature of the carbon black particles' surface (3) (surface activity), and particularly, the nature of the carbon atoms at the surface of a particle, may affect rubber reinforcement. Similarly the chemical nature of the particles' surface, and particularly the presence of oxygen at the surface along with phenolic, ketonic and carboxylic groups, inter alia which are known to be present on the surface, affect the crosslinking of the rubber and its vulcanized properties. See Rubber Technology and Manufacture, edited by C. M. Blow, p 180, CRC Press, International Scientific Series (1971). According to Blow, there appears to be no direct connection between the chemical nature of the surface (i.e. the individual chemical groups of the particle surface) and the surface activity or the properties which the black confers on the rubber.

West et al showed that an increasing rolling loss coefficient, caused by increasing the nitrogen surface area of the black ($N_2$ absorption), gave a correlation coefficient of 0.97 for N234, N351, N375 and N220 blacks. A similar correlation was made regarding the $I_2$ No. and tinting strength of the blacks. No such meaningful correlation was found regarding the compressed DBPA values of the blacks. (It should be noted that the blacks used in the study have similar DBPA values (in the range of 114–125), ad it would be expected that any differences in properties based on DBPA or crushed DBPA would be difficult to detect for these blacks.) Although this apparently contradicts what was known in the prior art, West's dry traction results showed a poor correlation with rolling loss. West's dry traction results did correlate well with $I_2$ No. and tinting strength (see "The Effects of Carbon Black on Rolling Resistance of a Tire Tread Compound" by J. R. West et al, Rubber Chemistry and Technology, supra, at page 509).

The ratio of $N_2$ absorption to $I_2$ absorption ($N_2/I_2$) can be used as a measure of surface activity. A ratio greater than 1 denotes high surface activity.

Other methods of measuring surface activity, e.g. the bound rubber test, are well known in the art.

It is an object of the invention to use property correlations of carbon blacks in general to provide a rubber composition which is reinforced with high structure carbon black and used in the tread rubber of a tire, which provides a tire which demonstrates good irregular wear properties and good rolling resistance properties while maintaining other necessary properties.

Other objects and uses of the rubber compositions of the invention will be apparent to those skilled in the art from the following description and claims.

DEFINITIONS

"Global treadwear" refers to normal treadwear, generally evenly distributed around a tire.

"Irregular treadwear" refers to uneven patterns of wear, sometimes localized on a single lug where one side of a lug wears faster than another.

"Lugs" refers to discontinuous radial rows of tread rubber in direct contact with the road surface.

"Footprint" refers to the contact patch or area of contact of the tire tread with a flat surface at zero speed and under normal load and pressure or under specified load, pressure and speed conditions.

"Shoulder" refers to the upper portion of sidewall just below the tread edge.

"Equatorial plane" refers to the plane perpendicular to the tire's axis of rotation and passing through the center of its tread.

"Rolling resistance" refers to the energy absorbed/lost by the tire when the tire rolls (including inertia and friction).

"Traction" refers to the ability of a tire to grip or hold the surface with which it makes contact.

"Tinting strength" refers to the ability of a carbon black to tint or "grey" a white paint. As used herein, tint numbers are determined by ASTM D-3265.

"E'" refers to the storage modulus of a material, e.g. rubber, and is an expression of the ability (energy stored) of the material to return to its original shape when distorted.

"E''" refers to the loss modulus of a material and is an expression of the energy lost in heat (hysteresis) when the material is distorted.

"Tan delta" refers to the ratio $E''/E'$ and represents a measure of the lag of strain behind stress in a distorted material.

"$H_F$" refers to heat rise under constant force/load (a measure of hysteresis) which is an indication of energy loss for the compound under constant force.

"Black structure" (ASTM definition) refers to the quality of irregularity and deviation from sphericity of the shape of a carbon black aggregate.

"Bead" refers to that part of the tire comprising an annular tensile member wrapped by ply cords and shaped, with or without other reinforcement elements, to fit the design of the rim.

"Carcass" refers to tire structure apart from the belt structure, tread, undertread, and sidewall rubber, but including the beads.

"Carcass plies" comprise parallel longitudinal reinforcing members which are wrapped around the beads.

"Crown" refers to that portion of the tire within the width area of the tread in the vicinity of the tread.

"Modulus" refers to the ratio of the change in stress to the change in strain (a measure of stiffness).

"Tensile strength" refers to the stress needed to break (e.g. a rubber strip) expressed in force/cross-sectional area.

SUMMARY OF THE INVENTION

The invention relates to a rubber composition which is reinforced with carbon black having a structure represented by a DBPA of 140–185 cm$^3$/100 g, an $I_2$ surface area absorption of 65–140 mg/g and a 93–115 tint. In a preferred embodiment, the carbon black has a CDBPA of 90–130 cm$^3$/100 g and a CTAB of about 74–114 m$^2$/gm. The rubber composition employing the high structure (HS) carbon black has a 300% modulus of 11–17 MPa, a tensile strength of 18–22 MPa, and a Shore A hardness of 60–78. In its preferred embodiment the rubber composition of the invention also demonstrates an E' of 8–20 MPa at room temperature (RT) and a tan delta of 0.24–0.10 (RT) (as tested on a Gehman vibrotester).

Also provided is a pneumatic tire comprising at least two spaced inextensible beads, carcass plies having parallel reinforcing cords wrapped around said beads, a ground contacting tread portion disposed over said carcass plies in a crown area of the tire, sidewalls disposed between the tread and the beads, wherein the tread composition comprises the rubber composition of the invention.

It has been found that when a tire made using a tread rubber composition employing the carbon black of the invention is tested such that it is prone to irregular wear, it is substantially free of irregular wear through 25,000 miles, and irregular wear advances slowly after that mileage, whereas tread made with conventional blacks used on similar tires, tested in the same manner, show irregular wear after as low as 8,000 miles, and had such severe irregular wear that vibration and noise exceeded acceptable levels after about 10,000 miles.

DETAILED DESCRIPTION OF THE INVENTION

By taking into consideration the known characteristics of carbon black, it was hypothesized, according to the present invention, that a carbon black showing a good balance between rolling resistance properties and irregular treadwear properties, when used in tread rubber, could be obtained.

Prior art has shown that particle size and structure can be correlated with the physical properties of the carbon black in a direct relationship that does not vary with reference to the composition of rubber in which it is used. For example, with reference to FIG. 1, when typical black structure (in terms of DBPA values) is plotted against surface area (in terms of $I_2$ absorption), it can be shown that best rolling resistance in tires is demonstrated by tread rubbers that are reinforced with tread blacks having a structure of about 110-130 cm$^3$/100 g DBPA and a relatively smaller surface area (as represented by an $I_2$ No. of about 70-95 mg/g) as illustrated by curve 10. The best traction is obtained in tread rubber employing a carbon black reinforcement having a structure of about 115-130 cm$^3$/100 g DBPA and a high surface area (about 140-150 mg/g $I_2$ No.) (curve 14); and the best global treadwear is achieved by using a reinforcing black that has a balance between structure and surface area as illustrated by curve 16. The black used to reinforce the tread rubber of the invention is illustrated by curve 18.

Figure 1:
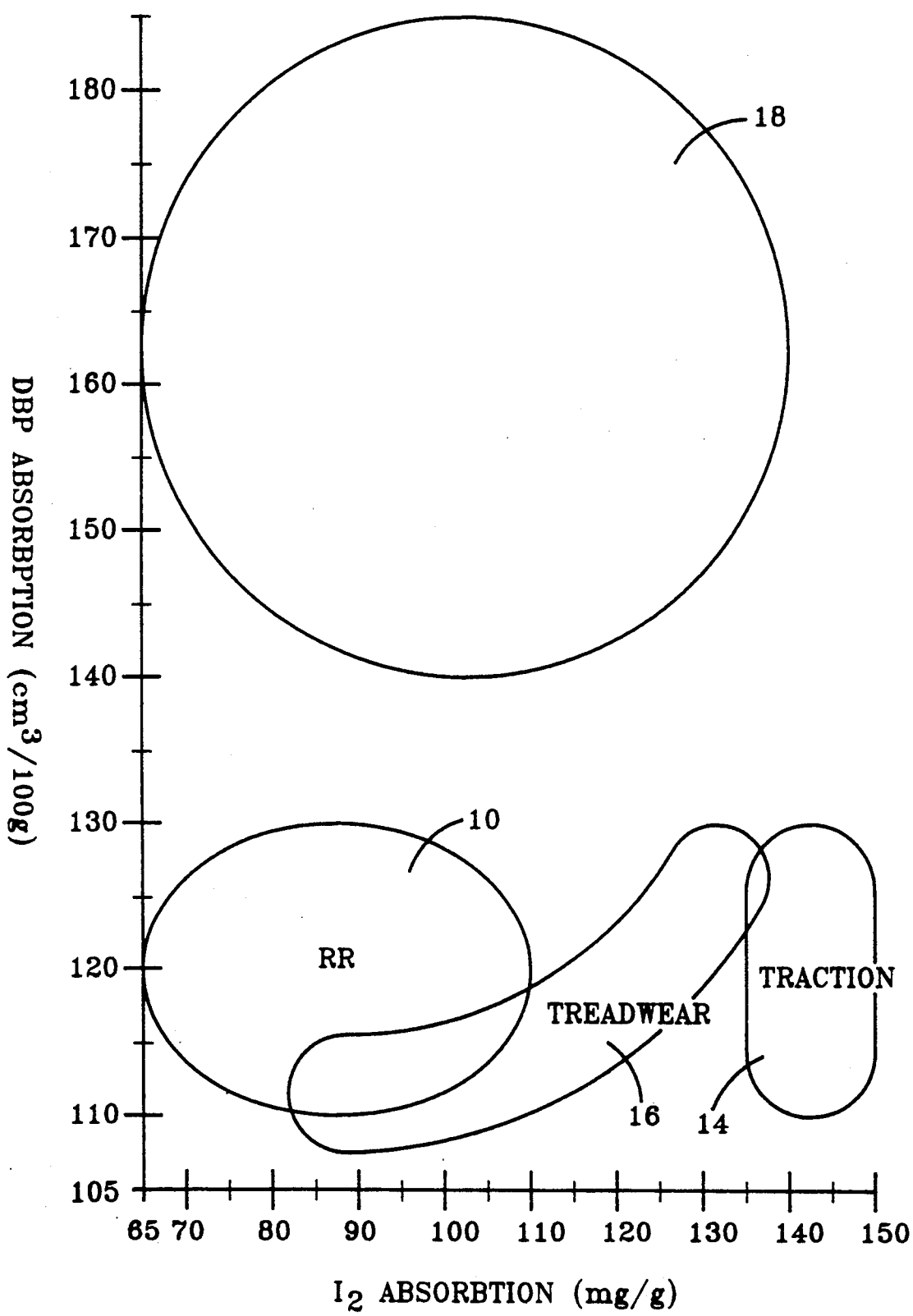
FIG. 1 illustrates a graph of known properties of carbon blacks as they relate to use in tread rubber for tires as compared to properties of a carbon black used in the invention.

Accordingly, within certain limits having to do with variables in surface activity and surface area, the properties (in rubber) of carbon black having a specific structure and particle size can be predicted, based on prior art, with reference to the graph shown in FIG. 1.

Based on the known properties of carbon blacks, it was theorized that blacks having extremely high structure would show properties that would (when used in tread rubber) help solve the problem of irregular wear. Accordingly, it was an object of the present invention to develop and/or utilize a carbon black having very high structure (in the range of 140 cm$^3$/100 g to 185 cm$^3$/100 g DBPA, preferably about 150-170 cm$^3$/100 g, and relatively large size, having an $I_2$ number of about 65-140 mg/g, preferably about 80-130 mg/g, to be used in a tread rubber composition intended for use in pneumatic tires.

In recent years, it has been discovered that the tint properties and surface activity, and more recently the CDBPA (crushed DBPA), of the carbon black are important to the properties of the rubber composition employing the black. In accordance with the present invention, it has been noted that a high CDBPA value correlates with good irregular wear properties.

Carbon blacks used in prior art tread rubber have a tint in the range of 90-120 as determined by ASTM D-3265, whereas the carbon black used in the invention has a tint of about 93-115: prior art carbon blacks have a CDBPA of 90-110 cm$^3$/100 g, whereas the black used in the present invention has a CDBPA of about 105-135 cm$^3$/100 g; and the carbon blacks used in the invention have a high surface activity based on the properties of the rubber observed in testing. It has also been observed that the carbon black used in the invention has a CTAB (cetyl trimethyl ammonium bromide absorption) of about 84-110 m$^2$/gm.

Exemplary carbon blacks of the invention demonstrated a CTAB of about 84 and 104, a DBPA of about 152 cm$^3$/100 g, an $I_2$ absorption of about 120 mg/g, and a tint of about 98.

Figure 2:
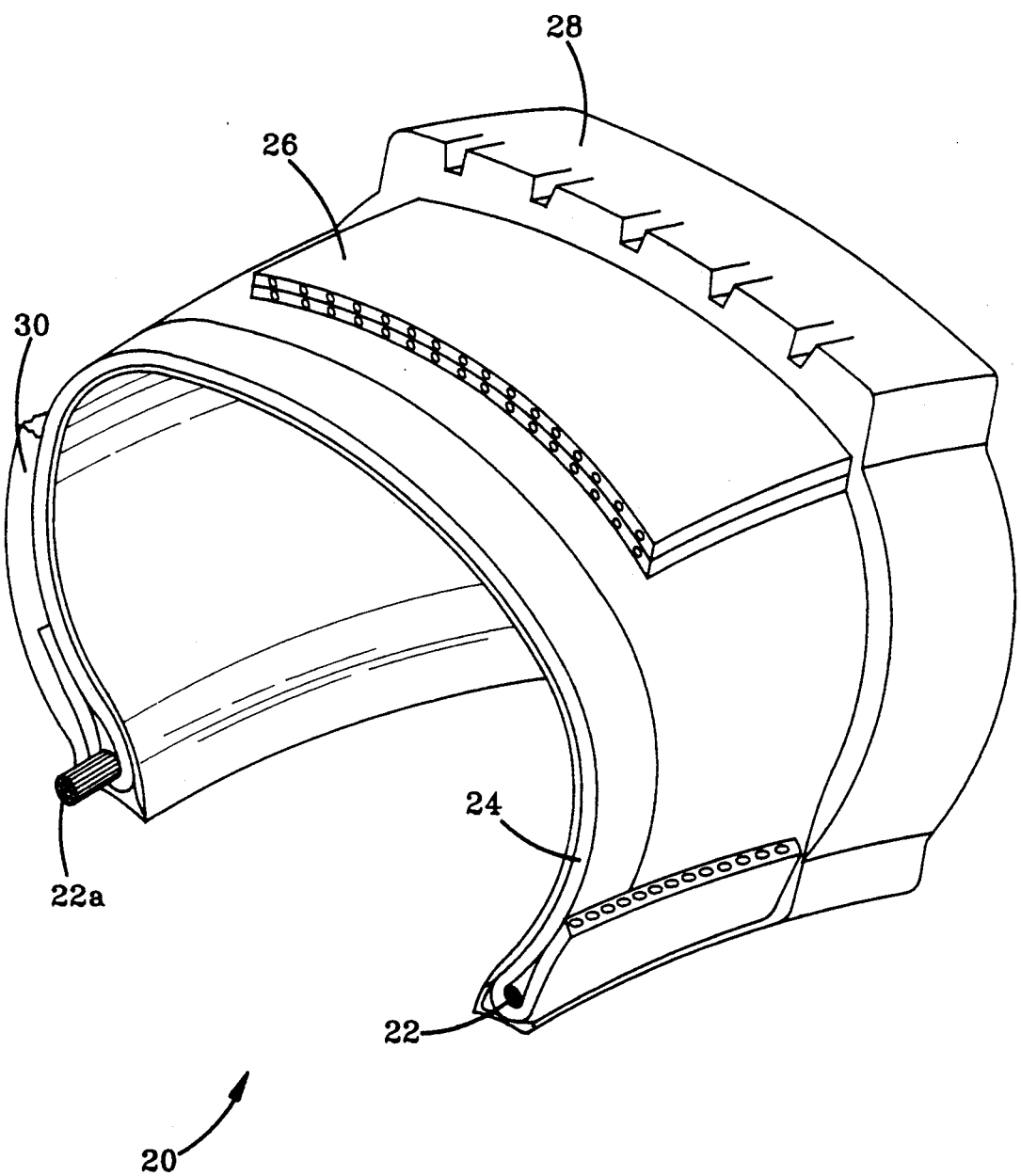
FIG. 2 illustrates a tire made using the carbon black reinforced rubber composition of the invention.

With reference now to FIG. 2, a tire made using a tread rubber reinforced with the high structure blacks described herein is illustrated. Tire 20 comprises a pair of bead rings 22,22a, carcass plies 24 wrapped around bead rings 22,22a, optional reinforcement plies 26 (i.e. belts or breakers) disposed over the carcass plies in a crown area of the tire, tread rubber 28 disposed over optional reinforcement plies 26 in the crown area of the tire, and sidewalls 30 disposed between tread rubber 28 and beads 22,22a. Tire 20 is constructed as is conventional in the art except that the tread rubber is loaded with a very high structure carbon black as described herein in place of a conventional tread black.

In accordance with the present invention, it is believed that the properties observed may be further optimized for other specific purposes or different tread designs. With this in mind, it is the purpose of the present invention to provide tread rubber compositions employing a range of carbon blacks which have a very high structure and intermediate size wherein the rubber has maintained modulus properties, hardness and E' values while using a lower loading of carbon black in the rubber. All these properties are directly related to good rolling resistance in a tire. Accordingly, the parameters of the carbon black used in the rubber of the invention may have preferred ranges of properties as follow:

DBPA of 140-185, preferably 150-170 cm$^3$/100 g.
$I_2$ No. of 65-140, preferably 80-130 mg/g.
Tint of 93-115.
CDBPA of 90-135, preferably 110-125 cm$^3$/100 g.
CTAB of 74-114, preferably about 84-104 m$^2$/g.

It has been found in accordance with the invention that the use of the very high structure black of the invention makes it possible to maintain stiffness in a tire tread while using a lower loading of carbon black, which means that a tire made using the carbon black in this manner will experience less heat build-up (lower hysteresis). Similarly, viscoelastic properties, tan delta, modulus, and other related properties may be optimized for a specific use by modifying the measured properties of the carbon black within the ranges given above.

The invention is further illustrated with reference to the following examples.

EXAMPLE 1

This example illustrates the properties of carbon blacks of the invention and describes test rubber compounds in which the carbon blacks are employed.

In the examples, compositions employing N299 blacks are used as a control since N299 is a conventional tread black. HS-1 and HS-2 are novel carbon blacks made to Goodyear specifications by Cabot Corporation, Atlanta, Ga. N358 is a carbon black which is conventionally used in V-belts and hoses.

TABLE I

HIGH TINT, HIGH STRUCTURE TREAD BLACKS
CARBON BLACK PROPERTIES

| CARBON BLACK | I$_2$# | DBP | TINT | CTAB | CDBP |
|---|---|---|---|---|---|
| N299 | 108 | 124 | 113 | 104 | 105 |
| HS-1 | 81 | 152 | 98 | 84 | 113 |
| HS-2 | 79 | 170 | 111 | 94 | 112 |
| N358 | 84 | 150 | 99 | 82 | 110 |

TABLE II

RUBBER MASTERBATCH (MB) FORMULATIONS

| | MB1 | MB2 | MB3 | MB4 |
|---|---|---|---|---|
| NATURAL RUBBER | 25.00 | 25.00 | 25.00 | 25.00 |
| SBR | 50.00 | 50.00 | 50.00 | 50.00 |
| BR[1] (OE[2] to contain 37.5 phr oil | 34.38 | 34.38 | 34.38 | 34.38 |
| CARBON BLACK (N299) | 60.00 | | | |
| CARBON BLACK (HS-1) | | 60.00 | | |
| CARBON BLACK (HS-2) | | | 60.00 | |
| CARBON BLACK (N358) | | | | 60.00 |
| ASTM 101 process oil | 14.00 | 14.00 | 14.00 | 14.00 |
| IPPD (ISOPROPYL PROPYLENE DIENE) | 1.50 | 1.50 | 1.50 | 1.50 |
| SUNOLITE[3] 240 ® WAX | 1.00 | 1.00 | 1.00 | 1.00 |
| PEPTIZER | 0.10 | 0.10 | 0.10 | 0.10 |
| RESORCINOL | 1.00 | 1.00 | 1.00 | 1.00 |
| WINGSTAY[4] 100 | 1.00 | 1.00 | 1.00 | 1.00 |
| ZINC OXIDE | 4.00 | 4.00 | 4.00 | 4.00 |
| STEARIC ACID | 3.50 | 3.50 | 3.50 | 3.50 |
| MB TOTAL | 195.48 | 195.48 | 195.48 | 195.48 |

[1]polybutadiene rubber
[2]OE = oil extended
[3]available from Witco
[4]available from The Goodyear Tire & Rubber Company

TABLE III

TEST RUBBER COMPOUNDS

| MASTERBATCH | 1 | 195.48 | | | |
|---|---|---|---|---|---|
| | 2 | | 195.48 | | |
| | 3 | | | 195.48 | |
| | 4 | | | | 195.48 |
| HEXAMETHYLENE TETRAMINE | | 1.25 | 1.25 | 1.25 | 1.25 |
| MORFAX ®[5] | | 0.89 | 0.89 | 0.89 | 0.89 |
| SULFASAN R ®[6] | | 0.79 | 0.79 | 0.79 | 0.79 |
| SULFUR | | 1.50 | 1.50 | 1.50 | 1.50 |
| TOTAL | | 199.91 | 199.91 | 199.91 | 199.91 |
| COMPOUND | | A | B | C | D |
| SPEC. GRAV. | | 1.176 | 1.176 | 1.176 | 1.176 |

[5]available from Vanderbilt
[6]available from Monsanto

EXAMPLE 2

This example illustrates the physical properties of each of the rubber compounds prepared in Example 1. All comparisons are made relative to the control.

Pendulum skid data illustrates the following:
(1) Both high structure experimental blacks are equivalent to the control on wet asphalt surfaces;
(2) HS#1 and HS#2 are directionally worse than the control on wet concrete surfaces; and
(3) All high structure blacks show better skid resistance on dry asphalt surfaces.

Instron tear data illustrates a directionally worse tear value for the high structure blacks as compared to the control.

Vibrotester E' (Dynamic Modulus) at 100° C. illustrates a significantly higher dynamic modulus for both HS#1 and HS#2. The loss modulus (E") is also significantly higher for HS#1 and HS#2. Tan delta is at a higher level for high structure blacks evaluated.

However, H$_F$ is improved for HS#1 and HS#2.

Vibrotester at ambient temperature shows a higher dynamic modulus (E') for experimental HS#1 and HS#2. The loss modulus (E") also increased for HS#1 and HS#2. Tan delta values on all high structure blacks were equal to lower than the control. H$_F$ values were significantly improved for HS#1 and HS#2.

Vibrotester test parameters include 60 Hz vibration at 8% compression.

300% modulus values illustrate higher values for all high structure blacks. Tensile-at-break values were equal to slightly lower for the high structure blacks. Elongation at break values were lower.

Goodyear Healy Rebound at 100° C. and room temperature illustrates slightly lower values for the HS#1 and HS#2 carbon black compound. N358 was equal to N299.

Arthur D Little Rebound test illustrates lower values for HS#1 and HS#2 at temperatures above 5° C. N358 is equal to the control except at the low or high temperature extremes.

Goodyear Flex (constant amplitude conditions) results show an increased temperature rise in both of the experimental high structure blacks, apparently because of the increased stiffness of the compound. Shore hardness is higher in all high structure blacks. Dynamic and static compression results reflect the increased hardness in all high structure blacks.

Rheometer data illustrates two major points: (1) increased minimum and maximum viscosity with all high structure blacks: and (2) no significant difference for cure rate due to black type.

Ring abrasion data illustrates lower volume loss for the HS#1 and HS#2 blacks.

In the following tables, the first column indicates the time and temperature of the cure (e.g. 28'/150° C.). The values given are normalized with respect to a lab standard.

In the following tables (N) represents internal heat generation, (R) represents resilience, (H$_X$) represents the heat rise at constant amplitude, (H$_F$) represents heat rise at constant force, and (C") represents the loss compliance where $$C' = \frac{E''}{|EC|^2} \text{ where } EC = \sqrt{(E'')^2 + (E')^2}$$

TABLE IV (SKID AND TEAR DATA)

| COMPOUND | A<br>N299 | B<br>HS#1 | C<br>HS#2 | D<br>N358 |
|---|---|---|---|---|
| Pendulum Skid (121) Wet Asphalt Surface 28'/150° C. | 56 | 56 | 55 | 56 |
| Pendulum Skid (122) | | | | |

TABLE IV-continued (SKID AND TEAR DATA)

| COMPOUND | A N299 | B HS#1 | C HS#2 | D N358 |
|---|---|---|---|---|
| Wet Concrete Surface 28'/150° C. Pendulum Skid (123) | 64 | 62 | 60 | 61 |
| Dry Asphalt Surface 28'/150° C. Pendulum Skid (124) | 81 | 84 | 84 | 84 |
| Dry Concrete Surface 28'/150° C. | 89 | 86 | 89 | 87 |
| INSTRON TEAR (290) work to break (N-cm) 2 runs/sample | | | | |
| 23'/150° C. (N-cm) | 505/391 | 397/450 | 328/342 | 296/232 |
| 41'/150° C. (N-cm) | 421/391 | 380/375 | 332/343 | 342/308 |

TABLE V (VISCOELASTICITY DATA) VIB. DYNAMIC MODULUS @ 100° C.

| | | N299 | HS#1 | HS#2 | N-358 |
|---|---|---|---|---|---|
| (E') MPa | 18'/150° C. | 9.616 | 11.366 | 11.469 | 9.770 |
| | 36'/150° C. | 9.745 | 11.709 | 11.680 | 10.105 |
| (N) MPa·sec | 18'/150° C. | 31.3 | 44.7 | 41.8 | 32.4 |
| | 36'/150° C. | 31.5 | 44.0 | 42.8 | 36.2 |
| (R) | 18'/150° C. | 46.0% | 38.8% | 41.3% | 45.1% |
| | 36'/150° C. | 46.0% | 39.9% | 40.9% | 41.7% |
| (Hx) | 18'/150° C. | 136.0 | 182.0 | 176.0 | 141.0 |
| | 36'/150° C. | 138.0 | 185.0 | 181.0 | 154.0 |
| (HF) | 18'/150° C. | 63.0 | 61.0 | 58.0 | 63.0 |
| | 36'/150° C. | 63.0 | 58.0 | 57.0 | 65.0 |
| (E") MPa | 18'/150° C. | 1.210 | 1.747 | 1.643 | 1.262 |
| | 36'/150° C. | 1.227 | 1.747 | 1.695 | 1.435 |
| (C") | 18'/150° C. | 0.013 | 0.013 | 0.012 | 0.013 |
| | 36'/150° C. | 0.013 | 0.012 | 0.012 | 0.014 |
| tan delta | 18'/150° C. | 0.126 | 0.154 | 0.143 | 0.129 |
| | 36'/150° C. | 0.126 | 0.149 | 0.145 | 0.142 |

TABLE VI (VISCOELASTICITY DATA) VIB. DYNAMIC MODULUS 60 Hz, AMBIENT TEMPERATURE

| | | N299 | HS#1 | HS#2 | N-358 |
|---|---|---|---|---|---|
| (E') MPa | 18'/150° C. | 12.359 | 17.465 | 17.465 | 14.671 |
| | 36'/150° C. | 13.922 | 18.186 | 18.804 | 15.298 |
| (N) MPa·sec | 18'/150° C. | 77.0 | 99.2 | 90.1 | 77.5 |
| | 36'/150° C. | 76.7 | 100.8 | 93.4 | 75.9 |
| (R) | 18'/150° C. | 25.3% | 24.7% | 28.0% | 28.6% |
| | 36'/150° C. | 26.1% | 25.6% | 29.7% | 30.1% |
| (Hx) | 18'/150° C. | 261.0 | 345.0 | 329 | 274.0 |
| | 36'/150° C. | 269.0 | 354.0 | 346 | 280.0 |
| (HF) | 18'/150° C. | 63.0 | 49.0 | 46.0 | 55.0 |
| | 36'/150° C. | 60.0 | 46.0 | 42.0 | 52.0 |
| (E") MPa | 18'/150° C. | 2.977 | 3.964 | 3.60 | 2.977 |
| | 36'/150° C. | 3.029 | 4.016 | 3.704 | 2.977 |
| (C") | 18'/150° C. | 0.016 | 0.012 | 0.011 | 0.013 |
| | 36'/150° C. | 0.015 | 0.012 | 0.010 | 0.012 |
| tan delta | 18'/150° C. | 0.223 | 0.227 | 0.206 | 0.203 |
| | 36'/150° C. | 0.218 | 0.221 | 0.197 | 0.195 |

TABLE VII (STRENGTH DATA)

300% Static Modulus (MPa)

| | N299 | HS#1 | HS#2 | N-358 |
|---|---|---|---|---|
| 9'/150° C. | 9.0 | 12.4 | 13.4 | 12.6 |
| 18'/150° C. | 11.0 | 13.8 | 14.8 | 14.4 |
| 36'/150° C. | 12.0 | 14.8 | 15.4 | 14.8 |

TENSILE: (at max. elongation) (MN/m²)

| 9'/150° C. | 21.0 | 21.7 | 19.0 | 19.8 |
| 18'/150° C. | 18.8 | 19.2 | 18.2 | 19.8 |
| 36'/150° C. | 18.5 | 18.4 | 18.2 | 19.0 |

ELONGATION (maximum) %

| 9'/150° C. | 630% | 500% | 420% | 440% |
| 18'/150° C. | 470% | 420% | 380% | 420% |
| 36'/150° C. | 430% | 375% | 360% | 360% |

TABLE VIII (REBOUND DATA)

GOODYEAR HEALY REBOUND (GH) (100° C.): % REBOUND

| 28'/150° C. | 74.1 | 69.6 | 71.8 | 74.6 |
| 46'/150° C. | 74.1 | 70.7 | 71.9 | 74.6 |

(ROOM TEMPERATURE): % REBOUND

| 28'/150° C. | 60.0 | 55.5 | 57.0 | 60.5 |
| 46'/150° C. | 61.5 | 57.0 | 58.5 | 61.5 |

ARTHUR D LITTLE (ADL) REBOUND (%)

| 30° C. | 36 | 22 | 26 | 21 |
| 20° C. | 10 | 11 | 12 | 9 |
| 5° C. | 12 | 15 | 15 | 14 |
| 15° C. | 28 | 26 | 26 | 25 |
| 25° C. | 36 | 34 | 33 | 35 |
| 80° C. | 51 | 51 | 14 | 54 |
| 95° C. | 57 | 52 | 53 | 58 |

TABLE IX

GOODRICH FLEX

STATIC COMP.

| 28'/150° C. | 175 | 128 | 118 | 146 |
| 46'/150° C. | 195 | 143 | 240 | 153 |

DYNAMIC COMP. (at start)

| 28'/150° C. | 108 | 098 | 053 | 075 |
| 46'/150° C. | 116 | 084 | 084 | 088 |

TEMP RISE

| 28'/150° C. | 62° F. | 71° F. | 66° F. | 62° F. |
| 46'/150° C. | 63° F. | 73° F. | 67° F. | 62° F. |

% COMPRESSION SET

| 28'/150° C. | 4.2% | 2.4% | 1.6% | 1.4% |
| 46'/150° C. | 1.4% | 1.8% | 1.9% | 1.4% |

SHORE HARDNESS

| 18'/150° C. | 64 | 70 | 70 | 70 |
| 36'/150° C. | 67 | 71 | 72 | 70 |

TABLE X (CURE DATA) RHEOMETER DATA

| | N299 1 MIN | HS#1 1 MIN | HS#2 1 MIN | N-358 1.5 MIN |
|---|---|---|---|---|
| Time (S*MIN) | | | | |
| Minimum Torque dN.m | 9.5 | 11 | 11 | 10.75 |
| (1) T(1) (min) | 3.0 | 2.75 | 2.5 | 3.0 |
| (2) T(2) (min) | 4.0 | 3.5 | 3.5 | 4.25 |
| (3) T(5) (min) | 6.0 | 5.0 | 5.0 | 5.75 |

(1) Time of cure needed to increase torque value 1 dN.m.
(2) Time of cure needed to increase torque value 2 dN.m.
(3) Time of cure needed to increase torque value 5 dN.m.

| Maximum Torque dN.m | 44 | 47.0 | 47.5 | 46.75 |
| TC20 (20% CURE) | 6.5 | 5.75 | 5.75 | 6.5 |
| TC35 (35% CURE) | 7.5 | 6.5 | 6.75 | 7.5 |
| TC80 (80% CURE) | 11.75 | 10.0 | 10.0 | 11.0 |
| TC90 (90% CURE) | 15.0 | 13.0 | 12.75 | 14.0 |

TABLE XI

Ring Abrasion (cc Loss/sample)

| | N299 | HS#1 | HS#2 | N-358 |
|---|---|---|---|---|
| 28'/150° C. | 1.25 | .85 | .87 | 1.18 |
| | 1.22 | .88 | .89 | 1.18 |
| 46'/150° C. | 1.08 | .71 | .71 | 1.21 |

TABLE XI-continued

| Ring Abrasion (cc Loss/sample) | | | |
|---|---|---|---|
| N299 | HS#1 | HS#2 | N-358 |
| 1.32 | .88 | .93 | .98 |

EXAMPLE 3

Vector tires were made as is conventional in the art using the rubber compositions described below, as the tread stock for the tires. It is noted that N358 black, although known for use in hose rubber compounds and V-belt rubber compounds, has not heretofore been used as a tread black.

All ingredients are defined in terms of phr (parts per 100 parts rubber). The same loading of black (50 phr) was used in each tread compound prepared for evaluation.

Tread Rubber Formulations Used

| TIRE CONST. # | 72A | 77A | 78A | 79A | 79B |
|---|---|---|---|---|---|
| Cariflex SSCP 902 (Shell Chemical) | 40 | 40 | 40 | 40 | 40 |
| SMR-20 graded natural rubber | 60 | 60 | 60 | 60 | 60 |
| N299 carbon black (control) (phr) | 50 | | | | |
| HS#1 carbon black (phr) | | 50 | | | |
| N358 carbon black (phr) | | | 50 | | |
| N351 carbon black (phr) | | | | 50 | |
| V-2H carbon black (phr) | | | | | 50 |
| ASTM 101 process oil | 10 | 10 | 10 | 10 | 10 |
| IPPD (Isopropyl propylene diene | 2 | 2 | 2 | 2 | 2 |
| Sunolite 240 ® wax | 3 | 3 | 3 | 3 | 3 |
| Stearic acid | 2 | 2 | 2 | 2 | 2 |
| MB Total | 167 | 167 | 167 | 167 | 167 |

The following ingredients were added to each of the above formulations.

| Zinc oxide | 3.00 |
|---|---|
| Wingstay 100 | 1.15 |
| Sulfur | 1.25 |
| TMTD | 0.10 |
| Morfax ® | 1.25 |
| Sulfasan R | 0.50 |
| Formulation Total | 174.25 |

EXAMPLE 4

This example illustrates the properties and physicals of factory mixed stocks (the formulation described in Example 3) taken prior to tread extrusion and the subsequent tire build.

Cure conditions were 18'/150° C.

Since a correlation between the carbon black used and the properties of the rubber is being made in this example, the formulations are identified in terms of the carbon black used.

N351 and Vulcan 2H ® (V-2H) are commercially available blacks (from Cabot) having a normal (for tread black) structure (as represented by respective DBPA's of 120 and 127) and average size (respective $I_2$ Nos. of 67 and 80) which have been employed as additional controls for tire testing.

TABLE XII

| | (STATIC STRESS/STRAIN DATA) | | | | |
|---|---|---|---|---|---|
| | 50 N299 (control) | 50 HS-1 | 50 N358 | 50 N351 | 50 V-2H |
| 300% Static Modulus (MPa) | 12.3 | 13.6 | 12.4 | 10.8 | 12.2 |
| Tens @ brk (MPa) | 20.6 | 20.8 | 20.0 | 19.4 | 19.8 |
| Elong @ brk | 450% | 415% | 450% | 470% | 440% |
| GH Rebound (%) | | | | | |
| 100C Rebound | 62.0 | 64.7 | 63.8 | 65.2 | 62.2 |
| Ambient Rebound | 80.3 | 82.0 | 82.1 | 82.1 | 79.2 |
| ADL Rebound (%) | | | | | |
| −20C Rebound | 23.0 | 17.0 | 16.0 | 16.0 | 11.0 |
| −5C Rebound | 10.0 | 10.0 | 10.0 | 11.0 | 10.0 |
| +5C Rebound | 13.0 | 14.0 | 13.0 | 13.0 | 14.0 |
| +15C Rebound | 21.0 | 20.0 | 21.0 | 19.0 | 22.0 |
| +30C Rebound | 30.0 | 32.0 | 32.0 | 30.0 | 32.0 |
| +60C Rebound | 47.0 | 51.0 | 49.0 | 48.0 | 48.0 |
| +80C Rebound | 54.0 | 57.0 | 55.0 | 52.0 | 55.0 |
| +95C Rebound | 60.0 | 63.0 | 60.0 | 62.0 | 63.0 |
| Pico Abrasion (Rating relative to lab standard) | 95 | 102 | 94 | 79 | 108 |

EXAMPLE 5

This example illustrates the properties of tires from Example 3 made using the carbon blacks of the invention as compared to controls using conventional tread carbon blacks (N299, N351 and Vulcan 2H ®). In the tests it was shown that tires made using HS#1 carbon black had the best overall properties.

67" Rolling Resistance results illustrate the largest improvements for the N351 and Vulcan 2H ® carbon blacks over the control. HS#1 and N358 are slightly better than the N299 control.

Twin Roll Rolling Resistance results indicate an improvement in rolling resistance for all blacks examined as compared to the N299 control. N358 and Vulcan 2H ® showed the most improvement.

GM Wet Trailer Traction results illustrate equal wet skid at both 20 and 60 mph for all blacks. The numbers are slightly different, but due to the high inherent testing variability, results are considered statistically equal. Only N358 at the 60 mph wet skid is measurably lower than the control.

GM Dry Trailer Traction results indicate all compounds to be equal, within the inherent testing variability.

Values for all the tests were normalized to a rating based on control 72A=100.

The data obtained is provided as follows:

| 67" DIAMETER FLYWHEEL ROLLING RESISTANCE | | | | | |
|---|---|---|---|---|---|
| CONST. # | 72A | 77A | 78A | 79A | 79B |
| 100% r-load | 100 | 102 | 102 | 105 | 105 |
| 80% r-load | 100 | 102 | 103 | 105 | 105 |
| 60% r-load | 100 | 104 | 103 | 106 | 104 |
| Twin Roll- Rolling Resistance | | | | | |
| Rating | 100 | 102 | 106 | 104 | 106 |
| GM Trailer Traction - Wet Macadame Concrete (average of peak and slide) | | | | | |
| 20 MPH | 100 | 104 | 101 | 98 | 102 |
| 60 MPH | 100 | 96 | 92 | 96 | 97 |
| GM Trailer Traction - Dry Macadame Concrete (average of peak and slide) | | | | | |
| 40 MPH | 100 | 99 | 98 | 100 | 100 |
| Irregular Treadwear Testing (Ratings) | | | | | |
| RT Front | 100 | 147 | 92 | 84 | 86 |
| Ave Front | 100 | 122 | 82 | 85 | 94 |
| All Tire Average | 100 | 118 | 103 | 91 | 103 |

Higher numbers indicate improved results for each of the tests. The data indicates that tires made using HS#1 black, for example, is statistically equivalent to the control in the rolling resistance tests and the traction tests, and substantially better than the control in irregular treadwear testing.

EXAMPLE 6

Maintaining tires in the free rolling position causes a very slow rate of wear which magnifies deficiencies in vehicle chassis design, tire or compound design, or any other factors that contribute to irregular treadwear.

In order to develop an understanding of the design and compound contributions to irregular treadwear, Goodyear developed a vehicle test in which tires from Example 3 were placed on a vehicle known to exaggerate irregular wear and driven over a slow treadwear route. Tires were not rotated. Urethane impression casts were formed at specified vehicle mileages. The casts were in turn examined visually and inspected by hand by engineers to determine relative differences in the wear properties of the compounds.

A qualitative rating was determined at specified mileages for these casts, and eventually for the tire upon test completion.

The right front tire position on the test vehicle demonstrated the worst irregular wear. All comparisons were made using the tire used on the right front position using construction #72A as the control with a value of 0, plus (+) to show results better than the control, and minus (−) to indicate results worse than the control.

| CONST. # | Control 72A | 77A | 78A | 79A | 79B |
|---|---|---|---|---|---|
| Appearance | 0 | +++ | + | − − − | =/− |

While certain embodiments of the invention have been specifically illustrated and described, those skilled in the art will recognize that the invention may be variously modified and practiced without departing from the spirit of the invention. The invention is limited only by the scope of the following claims.

What is claimed is:

1. A tread rubber composition having an E' of 8-20 MPa (RT), a tan delta of 0.24-0.10 (RT) as determined on a Gehman vibrotester, a 300% modulus of 11-17 MPa, a Shore A hardness of 60-78 and a tensile strength of 18-22 MPa wherein reinforcement in said rubber comprises 25 to 85 phr carbon black having a DBPA of 140-185 $cm^3$/100 gm, a particle size represented by $I_2$ surface area absorption of 65-140 mg/g, and a CTAB of 74-114 $m^2$gm and an ASTM D-3265 tint of 90-135.

2. The thread rubber composition of claim 1 comprising 25-85 phr carbon black wherein said carbon black has a DBPA of 152-180 $cm^3$/100 gm, a particle size as represented by an $I_2$ surface area absorption of 65-125 mg/g and a tint of 93-115.

3. The rubber composition of claim 1 wherein said carbon black has a particle size as represented by $I^2$ surface area absorption of 70-120 mg/g.

4. The rubber composition of claim 1 in which said carbon black has a CDBPA 90-135 $cm^3$/100 g, an $I_2$ absorption of 70-120 mg/g, a DBPA of 152-180 $cm^3$/100 gm, and a CTAB of 74-114 $m^2$/gm.

5. The rubber composition of claim 1 in which said carbon black has a CDBPA of about 110-125 $cm^3$/100 g and a CTAB of about 84-104 $m^2$/gm.

6. A pneumatic tire resistant to irregular wear comprising at least a pair of spaced inextensible beads, carcass plies having substantially parallel reinforcing cords wrapped around said beads, a ground contacting tread portion disposed over said carcass plies in a crown area of said tire, a pair of individual sidewalls disposed between said tread and said beads wherein the tread composition has an E' of 8-20 MPa (RT), a tan delta of 0.24-0.10 (RT) as determined on a Gehman vibrotester, a 300% modulus of 11-17 MPa, a Shore A hardness of 60-14 78 and a tensile strength of 18-22 MPa and comprises,
  (a) 100 parts rubber,
  (b) 0-60 hr processing oil,
  (c) 25-85 phr carbon black having a 140-185 $cm^3$/100 gm DBPA, particle size as determined by $I_2$ surface area absorption of 65-140 of mg/g, and a CTAB of 74-114 $m^2$/gm and an ASTM D-3265 tint of 90-135.

7. The pneumatic tire of claim 6 wherein said carbon black has a DBPA of 152-180 $cm^3$/100 gm, a particle size as represented by an $I_2$ surface area absorption of 65-125 mg/g, and a tint of 93-115.

8. The pneumatic tire of claim 6 wherein said carbon black has a particle size as represented by an $I_2$ surface area absorption of 70-120 mg/g.

9. The pneumatic tire of claim 6 in which said carbon black has CDBPA of 90-135 $cm^3$/100 g, an $I_2$ absorption of 70-120 mg/g, a DBPA of 152-180 $cm^3$/100 gm, and a CTAB of 74-114 $m^2$/gm.

10. The pneumatic tire of claim 6 in which said carbon black has a CDBPA of about 110-125 $cm^3$/100 g and a CTAB of about 104 $m^2$/gm.

11. A method of constructing a pneumatic tire which is resistant to irregular wear comprising the step of loading a tread rubber composition used in constructing said tire, with 25-85 phr carbon black having a DBPA of 140-185 $cm^3$/100 g, a particle size represented by an $I_2$ surface area absorption of 65-140 mg/g and a CTAB of 74-114 $m^2$/gm, and an ASTM D-3265 tint of 90-135 to provide a tread rubber composition having an E' of 8-20 MPa (RT), a tan delta of 0.24-0.10 (RT) as determined on a Gehman vibrotester, a 300% modulus of 11-17 MPa, a Shore A hardness of 60-78 and a tensile strength of 18-22 MPa.

12. The method of claim 11 which comprises the step of selecting said carbon black to have a DBPA of 152-180 cm$^3$/100 g, a particle size as represented by an I$_2$ surface area absorption of 65-125 mg/g, and a tint of 93-115.

13. The method of claim 11 which comprises the step of selecting said carbon black to have a DBPA of 152-180 cm$^3$/100 g, a particle size as represented by an I$_2$ surface area absorption of 65-125 mg/g, and a tint of 93-115.

14. The method of claim 11 in which said carbon black has CDBPA of 90-135 cm$^3$/100 g, an I$_2$ absorption of 70-120 mg/g, a DBPA of 152-180 m$^3$/100 gm, and a CTAB of 74-114 m$^2$/g.

15. The method of claim 11 in which said carbon black has a CDBPA of about 110-125 cm$^3$/100 g and a CTAB of about 104 m$^2$/g.

16. The method of claim 11 which comprises the further step of optimizing carbon black properties for use in a specific tire having specific desired properties.

* * * * *